United States Patent
Kortum

(10) Patent No.: US 6,753,026 B2
(45) Date of Patent: Jun. 22, 2004

(54) PROCESS FOR MAKING A RANGE OF LONG SHELF LIFE, FILLED BREAD SNACKS

(75) Inventor: Olaf Kortum, Neubiberg (DE)

(73) Assignee: Kraft Foods R & D Inc., Munich (DE)

( * ) Notice: Subject to any disclaimer, the term of this patent is extended or adjusted under 35 U.S.C. 154(b) by 8 days.

(21) Appl. No.: 10/140,391

(22) Filed: May 7, 2002

(65) Prior Publication Data

US 2003/0031761 A1 Feb. 13, 2003

(30) Foreign Application Priority Data

May 9, 2001 (EP) ............................................. 01111353

(51) Int. Cl.$^7$ ............................................. A21D 13/00
(52) U.S. Cl. ........................ 426/94; 426/138; 426/283; 426/496; 426/516
(58) Field of Search .......................... 426/94, 516, 138, 426/283, 496

(56) References Cited

U.S. PATENT DOCUMENTS 3,989,858 A * 11/1976 Williams ..................... 426/552
4,721,622 A    1/1988 Kingham et al.
6,406,731 B1 * 6/2002 Hartman ..................... 426/446

FOREIGN PATENT DOCUMENTS

FR        2 796 810        2/2001

* cited by examiner

Primary Examiner—Lien Tran
(74) Attorney, Agent, or Firm—Fitch, Even, Tabin & Flannery

(57) ABSTRACT

A process for making bread snacks with fillings of high water content is disclosed and the snacks have shelf lives at chilled or ambient temperatures of more than six weeks. Baked bread is used as raw material.

9 Claims, No Drawings

PROCESS FOR MAKING A RANGE OF LONG SHELF LIFE, FILLED BREAD SNACKS

PRIOR ART

Bread is a common food in many countries. In particular dark whole grain rye bread is becoming more and more popular.

Apart from this growth platform, snacking is also a growing consumer trend all over the world with emphasis on sweet and salty snacks. What is missing are convenient and premium quality savory snacks based on bread, in particular dark rye bread, with, e.g., cheese or sausage filling.

Longer shelf life, dough-based snacks with fillings are currently made by combining, e.g., fat-based creams in various flavor directions or fruit fillings with the raw dough prior to the baking process.

Existing wheat dough-based snacks with fillings or salty crackers filled with fat-based cream have in common that they are very dry and often not of good quality. To be shelf stable, it is necessary that the water content of these snacks is low. A synonym for dryness is the amount of free water in this food product measured as the so-called water activity (Aw value) where pure water represents the value 1. A dry cracker provides an Aw of about 0.2 and a soft yeast dough or a biscuit dough provide Aw values of about 0.80–0.89. At these levels, the risk of pathogenic bacteria growth is almost zero, however, good GMP (Good Manufacturing Practice) is required when processing in order also to reduce the risk of potential yeast and mold growth.

To prevent filled bread dough snacks getting soggy after baking in particular with aging, it is required that the filling has a water activity similar to or reduced with respect to that of the dough. This balanced water activity ensures that water is not transferred between the filling and the dough. Savory or sweet dairy-based creams can be formulated to match a similar water activity, but they then taste very dry and no longer fresh. When a fresh slice of bread is spread with butter and topped with, e.g., cream cheese, it is known that this is done for immediate consumption. It needs to be eaten within hours because of moisture transferring from the topping into the bread. Fresh dairy products such as fresh cheese or cream cheese have a water activity of about 0.98–0.99, process cheese spreads or sausage spreads have such about 0.96 due to their high salt contents.

Shelf stable or chilled storage stable snacks consisting of dough and filling are currently made by adding, e.g., an Aw-reduced, fat-based, sweet dairy cream to the raw yeast dough prior to baking or to the baked goods after baking and cooling. When making dough-enrobed snacks using sweet or savory fillings with Aw values greater than 0.85, it is recommended to bake the snack fully with the filling to achieve optimum GMP. As described earlier, longer shelf life dough-based snacks are made by adding the filling to the raw dough prior to baking. During baking, the filling gets exposed to the convecting heat. Depending on the baking time required for the individual type of dough, it could happen that the filling inside eventually starts to cook. Hand in hand with that, the pressure created steam leads to an expansion of the filling creating a pressure on the dough. When the dough is not flexible enough or does not expand in like manner, it is possible that the filling escapes explosively through cracks in the dough destroying the complete snack. The resulting postbaking product would not be acceptable for the consumer. Making conventional rye bread is based on very long baking processes. Because of this, it is extremely difficult to produce, e.g., cream cheese-filled rye bread snacks.

Making filled bread snacks in general involves a further issue, especially when using flexible raising doughs based on yeast or leavening agents. These doughs sustain the expansion of the filling during baking but it is often observed that a hollow space remains inside the snack on top of the filling after cooling. This is an obvious quality defect and reduces the consumer acceptance of the snack.

It was known that dark rye bread has a fairly long shelf life in comparison with other more wheat dough-based breads. This is mainly due to it being made from sour fermented rye dough which provides the rye bread with a low pH post baking of about 4.4–4.6. When this bread is additionally fully pasteurized in a closed container post baking, a shelf life of up to 6 months at ambient storage can be achieved. Different from other breads, rye bread is also fairly moist having a water activity of about 0.95–0.97 depending on the freshness and formulation of the bread.

Upon spreading cream cheese with an Aw value of about 0.99 on a slice of dark rye bread, e.g., pumpernickel, it does happen that the rye bread will become soggy after a while because the relative Aw difference still brings about a significant moisture transfer. The present invention relates to a process for making a rye bread snack with, e.g., a cream cheese type filling and which is stable for more than 6 or 12 weeks at chilled storage conditions without significant moisture transfer.

It is also known that the taste of bread or other baked goods is created especially during the baking process. The exposure to heat causes the caramelization of the sugar components or a Maillard reaction of the other dough components resulting in the typical baking aromas, flavors and colors. This is especially true for the rye bread baking process. Rye bread needs to be baked fairly long to get the typical dark color and strong flavor. As described above, it would be extremely difficult to make a filled rye bread snack exposed to such a baking process.

NL-A-8100325 describes a process for making a novel filled rye bread which needs long baking times and wherein the product is packed hot into foils.

DE-A-41 42 018 describes a process for making a shelf stable filled bread. This process has the disadvantage that the moisture transfer is not resolved, fillings are very limited and pasteurization takes place in two special plastic foils.

DE-A-39 25 055 teaches a process for making natural filled food (rye bread) which starts from raw sourdough and uses a full baking process. The shelf life of the products is short because the moisture transfer is not taken into consideration.

DE-U-296 09 924 illustrates a process for making a dough-enrobed sausage wherein prebaked rye dough is used for coating a special sausage which is for immediate consumption. An in-pack pasteurization process is not mentioned.

DE-A-25 15 224 describes a process for making a cuttable ready-to-eat dish which uses a special layering technique to make a baked meal preparation based on rye bread for immediate consumption.

All of those prior art references have in common that the aspects of shelf life and durability with regard to any quality defects because of moisture transfer or micro-biological constrains are not mentioned.

PROBLEM UNDERLYING THE INVENTION

The problem underlying the present invention is to provide novel filled dough enrobed snacks which provide a more fresh tasting filling, a good authentic bread taste, an optimum filling volume distribution in the inside of the bread and a long shelf life under chilled and ambient conditions.

THE INVENTION

The invention provides a process for making bread snacks with fillings of high water content and shelf lives at chilled and ambient temperatures of more than six weeks and which is characterized in that baked bread is used as raw material.

The invention also provides the bread snacks which are obtainable by that process.

The process is especially useful for snacks on the basis of rye bread.

The process of the invention preferably includes the followings steps:
(i) the baked bread is ground
(ii) water is added to the ground bread to improve its extrudability and to adjust its water activity to about 0.95–0.98 or higher,
(iii) the bread/water mixture is kneaded to a bread dough,
(iv) the bread dough is coextruded with the filling and
(v) the snacks are formed, packed and pasteurized.

In a preferred embodiment, glycerine is added in step (ii) in an amount of up to about 5 weight-% to permit the adjustment of the target water activity and to improve the coextrusion capability of the bread.

In a further preferred embodiment of the invention, protein powder is added in step (ii) in an amount of up to about 5 weight-% to improve the sticking properties of the bread dough.

The water activity of the filling and that of the bread in the finished snacks are about the same and is in the range of about 0.95–0.98, preferably 0.96–0.97.

DETAILED DESCRIPTION OF THE INVENTION

The process of the invention enables the manufacture of a range of novel multicomponent snack products. These snack products have a fresh tasting filling, a good authentic bread taste, an optimum filling volume distribution in the inside of the bread and a long shelf life under chilled and ambient conditions.

The process according to the invention is especially suitable for savory type snacks based on rye bread and containing cheese type fillings, like process cheeses, Aw-reduced cream cheese but also sweet compositions. The key difference from established technologies is that this invention uses already baked bread as raw material. The benefit of this is that a composed snack does not need to be baked further for developing the typical and liked bread flavors. The applied pasteurization of the complete snack in the pack delivers a safe product which can be stored for a long time either chilled or at ambient temperatures depending on the composition.

The process of this invention is now described in more detail.

A rye bread conventionally bulk baked in casings is ground after baking by a rotating knife cutter or high shear mixer, such as a Stephan cutter, into coarse crumbs. The moisture and consequently the water activity of this blend is adjusted by the addition of a defined amount of water and/or glycerine. When aiming for a snack with a more moist fresh filling such as, e.g., a cream cheese type filling, small amounts of water, e.g. about 10% water, are added to raise the initial Aw to about 0.95 to 0.98.

The water activity is defined as follows:

$$Aw = \frac{P}{Po},$$

wherein
P=partial pressure of water in the food product at temperature T,
Po=saturated water pressure of pure water at the given temperature T.

The Aw adjustment can be counterbalanced somewhat by adding glycerine. This permits the further addition of water, which is sometimes required for improving the coextrusion capability of the created dough. Glycerine, on the other hand, was found very beneficial for improving the dough structure after pasteurization. Accordingly, recommended usage levels could be in the range between 0 and about 5 weight-%, preferably about 2 weight-%. To further improve the processability of the dough blend made from crumbs and water and glycerine, the addition of protein powder is recommended in a range of 0 to about 5 weight-%, most preferably about 2–3 weight-%. Any protein can be used which provides good sticking properties when moisturized and which coagulates upon being heat treated. This could be animal, microbial or vegetable protein powders. Cereal proteins such as gluten are preferable but albumen protein is most preferable. It helps to increase the dough sticking properties necessary for good formability in a coextrusion process but most important it provides the desired firmness of the rye dough after pasteurization when an increased amount of water has been added to raise the Aw value. Further ingredients investigated for supporting extrusion capabilities and dough firmness rebuild were starch or other hydrocolloids, especially when fully hydrated prior to the addition in a separate cooking step in the formula defined water content. Any starch or hydrocolloid is suitable to firm-up the dough but blends of native starches with maltodextrins, in particular a blend of a native waxy corn starch with dextrin, were found most appropriate with regard to simultaneously providing very good sticking properties.

The created sticky rye dough adjusted to an Aw value of about 0.97 can be put into one of the hoppers of a Rheon coextruder. This machine is capable of combining dough with fillings into a multicomponent snack. The filling could be, e.g., a standard process cheese spread known on the market in the UK under the brand name Dairylea. It is also possible to use nonmeltable shredded process cheese if a very hard filling is desired. Both fillings have Aw values round about 0.95–0.97 depending on their dry matter.

A filling derived from cream cheese would be most preferable for creating a fresh tasting snack. To reduce the water activity of cream cheese to the target value, it is recommended to intervene during the conventional cream cheese making process with the addition of specific ingredients. So-called humectants such as glycerine, sorbitol but also ordinary sugar or salt are most effective for Aw reduction. All have in common that they have a very negative effect on the taste of the cream cheese. Apart from using humectants, the addition of any approved food grade ingredients has an effect on the water activity due to the dry matter increase in the cream cheese. Proteins were found to have the most potent relative Aw reducing effect followed by non-sweet maltodextrins and fat.

Accordingly, a well-balanced mixture of milk protein, fat and carbohydrates is chosen for making a product of the invention. For example, 80% cream cheese (40% dry matter) is mixed with 10% skim milk powder, 6% low DE maltodextrin, 2% carboxymethylcellulose and 2% glycerine (all % are weight-%), homogenized and pasteurized at 75° C. and filled into buckets. This cream cheese has a water activity of about 0.97 and also provides good heat stability when exposed to secondary heating in a snack. The filling is introduced into the second hopper of the Rheon extruder and coextruded into the rye dough forming a dough bar with cream cheese type filling. The filling is completely enclosed in the created dough snack. It is individually packed into a sealable plastic on, e.g., a form-fill-seal (FFS) packaging line. The snack pack is slightly vacuumized and exposed to a modified atmosphere (MAP) prior to sealing. The reduced pressure in the pack causes the dough to remain in a better shape when exposed to external heat. The snack packs then pass through a microwave heating tunnel with controlled electrical heat exposure ensuring that the snack reaches up to 75° C. throughout for at least one minute. The snack pack could also be pasteurized in a moist heat (85° C.) environment provided by a continuously or batch operated autoclave.

After cooling, the resulting snack is fully intact and provides excellent taste quality. It can be stored refrigerated or under ambient conditions depending on the type of dough, filling and variability of composition for more than 6 weeks.

EXAMPLE

The recipes for the cream cheese filling and the rye bread used in this example are provided below:

| Ingredients for the cream cheese filling | weight-% |
|---|---|
| Cream cheese | 80 |
| Common additives, e.g. skim milk powder, maltodextrin, carboxymethylcellulose, glycerine and others | 20 |
| Total | 100 |
| Aw Value 0.97 | |

| Ingredient for the Dough | weight-% |
|---|---|
| Rye bread ground | 80 |
| Glycerine | 1 |
| Water | 10 |
| Other common additives, e.g. egg white powder, maltodextrin, starch and others | 9 |
| Total | 100 |
| Aw Value 0.96–0.97 | |

A rye bread-based snack with cheese cream filling is made according to the above recipes. Industrially made rye bread loaves are cut into crumbs with a Stephan mixer at 800 rpm. The dough crumbs are transferred into a Hobart kneader and egg white powder and a mixture of starch, maltodextrin and water are added. A specified small amount of water is added just to ensure good kneading and sticking properties. The water activity of the bread is adjusted to an Aw of 0.96–0.97 and the pH is measured at about 4.6.

After kneading for 10 minutes at low speed, the dough is transferred into one of the hoppers of a dual fill Rheon extruder. The second hopper contains a modified cream cheese product. As mentioned above, this cream cheese consists of about 80 weight-% real cream cheese and 20 weight-% other dry substances like skim milk powder and maltodextrin. A small amount of humectants such as glycerine or sorbitol (<3%) can be added to adjust the cheese to a target Aw of about 0.95–0.98, preferably 0.96–0.97.

What is claimed is:

1. A process for making a bread snack comprising a bread dough and a filling, said method comprising:
    (i) providing a baked bread,
    (ii) grinding the baked bread,
    (iii) adding an effective amount of water to the ground bread to create a bread-water mixture, wherein the bread-water mixture has improved extrudability,
    (iv) kneading the bread/water-mixture to form the bread dough,
    (v) co-extruding the bread dough with the filling,
    vi) forming the co-extruded bread dough with the filling into a desired snack shape to form the bread snack wherein the bread dough has a water activity of greater than about 0.95, and
    (vii) packaging the bread snack.

2. The process according to claim 1, wherein glycerine is added in step (iii) in an amount of up to about 5 weight-%.

3. The process according to claim 2, wherein a protein powder is added in step (iii) in an amount of up to about 5 weight-%.

4. The process according to claim 1, wherein the filling has a water activity which is about the same as the water activity of the bread dough.

5. The process according to claim 1, wherein the baked bread is baked rye bread.

6. The process according to claim 1, wherein the water activity of the bread dough is greater than about 0.98.

7. The process according to claim 4, wherein the bread dough has a water activity of about 0.95 to about 0.98.

8. The process according to claim 5, wherein the filling has a water activity which is about the same as the water activity of the bread dough.

9. The process according to claim 8, wherein the water activity of the bread dough is about 0.95 to 0.98.

* * * * *